United States Patent
Judd et al.

(10) Patent No.: US 6,709,004 B1
(45) Date of Patent: *Mar. 23, 2004

(54) OFFSET MOUNTING SYSTEM FOR ASSEMBLING DRIVER SIDE AIRBAG MODULES

(75) Inventors: Todd B. Judd, Coalville, UT (US); David B. Johnson, Brigham City, UT (US); Patricia A. Lund, Plain City, UT (US)

(73) Assignee: Autoliv ASP, Inc., Ogden, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/794,710

(22) Filed: Feb. 4, 1997

(51) Int. Cl.[7] .......................... B60R 21/16; B60R 21/20
(52) U.S. Cl. .................... 280/728.2; 280/731
(58) Field of Search .................... 280/728.2, 731, 280/741, 743.1

(56) References Cited

U.S. PATENT DOCUMENTS

| | | | | |
|---|---|---|---|---|
| 4,183,550 A | * | 1/1980 | Sudou | 280/728.2 |
| 4,915,410 A | * | 4/1990 | Bachelder | 280/732 |
| 5,193,846 A | | 3/1993 | Allard | 280/728 |
| 5,246,249 A | * | 9/1993 | Satoh | 280/731 |
| 5,290,059 A | | 3/1994 | Smith et al. | 280/728 |
| 5,295,706 A | * | 3/1994 | Morita | 280/728.2 |
| 5,443,284 A | | 8/1995 | Strahl et al. | 280/728.2 |
| 5,470,102 A | | 11/1995 | Smith et al. | 280/728.2 |
| 5,501,484 A | | 3/1996 | Saderholm et al. | 280/728.2 |
| 5,580,080 A | | 12/1996 | Soderquist et al. | 280/728.2 |
| 5,676,396 A | * | 10/1997 | Fohl | 280/731 |

* cited by examiner

Primary Examiner—Ruth Ilan
(74) Attorney, Agent, or Firm—James D. Erickson; Sally J. Brown (57) ABSTRACT

An airbag mounting system for orienting an inflator, a retaining ring, an airbag cushion and a housing module of an airbag module assembly. The assembly includes an annular retaining ring having a plurality of first fastener openings circumferentially spaced about the ring. At least two of the plurality of first fastener openings being spaced from each other along the ring circumference by a first angle. At least one of the plurality of first fastener openings is offset from at least one of the at least two first fastener openings by a second angle different from the first angle. A module housing includes a plurality of second fastener openings circumferentially spaced about a central inlet opening. At least two of the second fastener openings are spaced from each other along the circumference by a third angle. At least one of the second fastener openings is offset from at least one of the at least two second openings by a fourth angle which is different from the third angle. An airbag having a gas inlet opening corresponding with the central opening of the module housing includes a plurality of third fastener openings circumferentially spaced about the gas inlet opening. At least two of the third fastener openings are spaced from each other along the circumference by a fifth angle. At least one of the third fastener openings is spaced from at least one of the at least two third openings by a sixth angle different from the fifth angle. Upon assembly the at least one of the first fastener openings is aligned with the at least one of the second and third fastener openings. A fastening stud extends through each of the plurality of first, second and third fastener openings for securing the retaining ring, airbag and housing module together.

9 Claims, 7 Drawing Sheets

PRIOR ART

OFFSET MOUNTING SYSTEM FOR ASSEMBLING DRIVER SIDE AIRBAG MODULES

BACKGROUND OF THE INVENTION

1. Field of the Invention:

The present invention relates to a mounting system for assembling various components of an airbag module, and more particularly, to a system having offset mounting means for positively orienting an inflator, retaining ring, cushion and housing assembly for driver side airbag modules.

2. Description of the Related Art:

During the manufacture of an airbag module of a vehicle safety system a plurality of components must be assembled. Among the components of the airbag module are the cover, airbag cushion, airbag clamping means (an annular retaining ring, module housing and fasteners), inflator, ignitor and means to attach the assembled module to the body of the automobile.

In a conventional airbag mounting, the peripheral region around the outer circumference of the gas inlet opening into the airbag is clamped between a module housing provided around the gas discharge or exit opening and an annular retainer secured to the module housing. The annular retainer is bolted or riveted to the module housing, see U.S. Pat. No. 5,443,284, assigned to the assignee of the present invention.

Deployment produced forces tend to pull and separate the airbag cushion from its mounting. Such mountings may be insufficient to prevent separation of the bag from the housing, Also rivets, etc. may break entering the passenger compartment along with the gas, endangering the vehicle occupants.

Both riveting and bolting require another step in the manufacturing process, which serves to delay production by increasing the time needed to produce the airbag module assembly. Moreover, workmen often must spend and inordinate amount of time trying to line up the corresponding holes of the components for insertion of the bolts and or rivets. If a misorientation does occur, reworking of the module is necessary and sometimes not possible. Often module parts cannot be reworked and must be discarded, resulting in increased production times and costs.

Although there are many visual, operator dependent methods for orienting the cushion, retaining ring, housing and inflator, for example, by coloring an edge of the airbag, such methods are strictly visual and misorientation of the components by the operator can still occur during assembly.

Misorientations of the airbag cushions with discrete vents can also cause burns to the vehicle occupant during deployment. If the vents are positioned improperly during assembly, the deployed gases will be directed downwardly toward the vehicle occupant.

Thus, a system and method for positively orientating the components of the airbag module is needed, without relying strictly on visual alignments by the production associates.

SUMMARY OF THE INVENTION

An object of the present invention is to provide a mounting system for eliminating misorientations of the components of the airbag module during assembly.

Another object of the present invention is to provide an assembly system which correctly aligns the components of an airbag module in a simple and inexpensive manner.

Still another object of the present invention is to provide a mounting system which does not strictly rely on visual orientation of a production associate.

In accomplishing these and other objectives of the present invention, there is provided an airbag mounting system for orienting an inflator, a retaining ring, an airbag cushion and a housing module of an airbag module assembly. The assembly includes an annular retaining ring having a plurality of first fastener openings circumferentially spaced about the ring. At least two of the plurality of first fastener openings being spaced from each other along the ring circumference by a first angle. At least one of the plurality of first fastener openings is offset from at least one of the at least two first fastener openings by a second angle different from the first angle. A module housing includes a plurality of second fastener openings circumferentially spaced about a central inlet opening. At least two of the second fastener openings are spaced from each other along the circumference by a third angle. At least one of the second fastener openings is offset from at least one of the at least two second openings by a fourth angle which is different from the third angle. An airbag having a gas inlet opening corresponding with the central opening of the module housing includes a plurality of third fastener openings circumferentially spaced about the gas inlet opening. At least two of the third fastener openings are spaced from each other along the circumference by a fifth angle. At least one of the third fastener openings is spaced from at least one of the at least two third openings by a sixth angle different from the fifth angle. Upon assembly the at least one of the first fastener openings is aligned with the at least one of the second and third fastener openings. Fastening means extend through the plurality of first, second fastener openings and the at least one of the third fastener openings for securing the retaining ring, airbag and housing module together.

Other features and advantages of the present invention will become apparent from the following description of the invention which refers to the accompanying drawings.

DETAILED DESCRIPTION OF THE PREFERRED EMBODIMENTS

Figure 1:
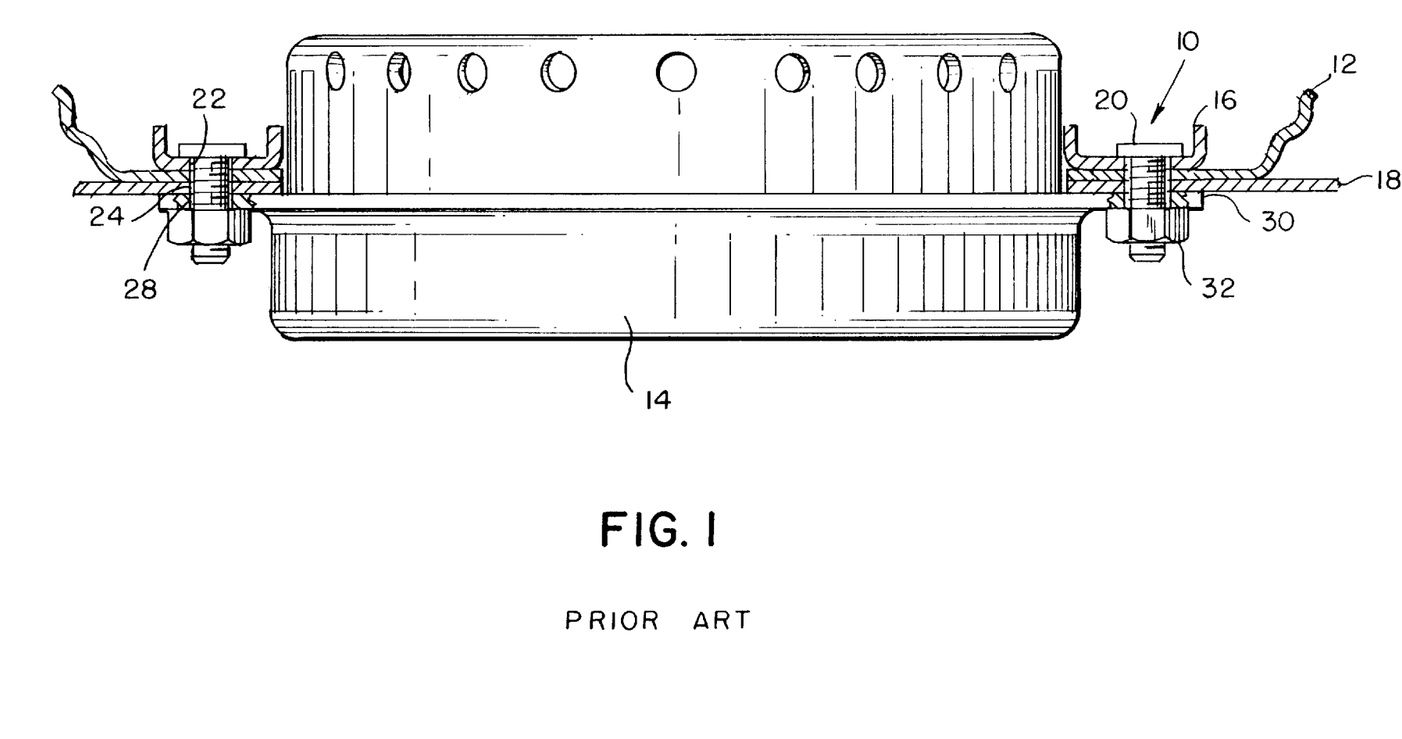
FIG. 1 is a side view, partially in cross-section, of a prior art airbag module.

Referring to FIG. 1, a prior art airbag module designated by the reference numeral 10 includes an airbag 12 mounted to an inflator 14 via a retaining ring 16 and a module housing 18. A fastener means 20, such as a bolt or other known fastener, passes through a retaining ring fastener opening 22, an airbag fastener opening 24, a module housing fastener opening 26, and an opening 28 in a flange 30 provided on inflator 14, terminating with a nut 32 or the like. It should be understood that the structural details and operation of the airbag module do not form a pert of the present invention and will not be described further herein.

Figure 2:
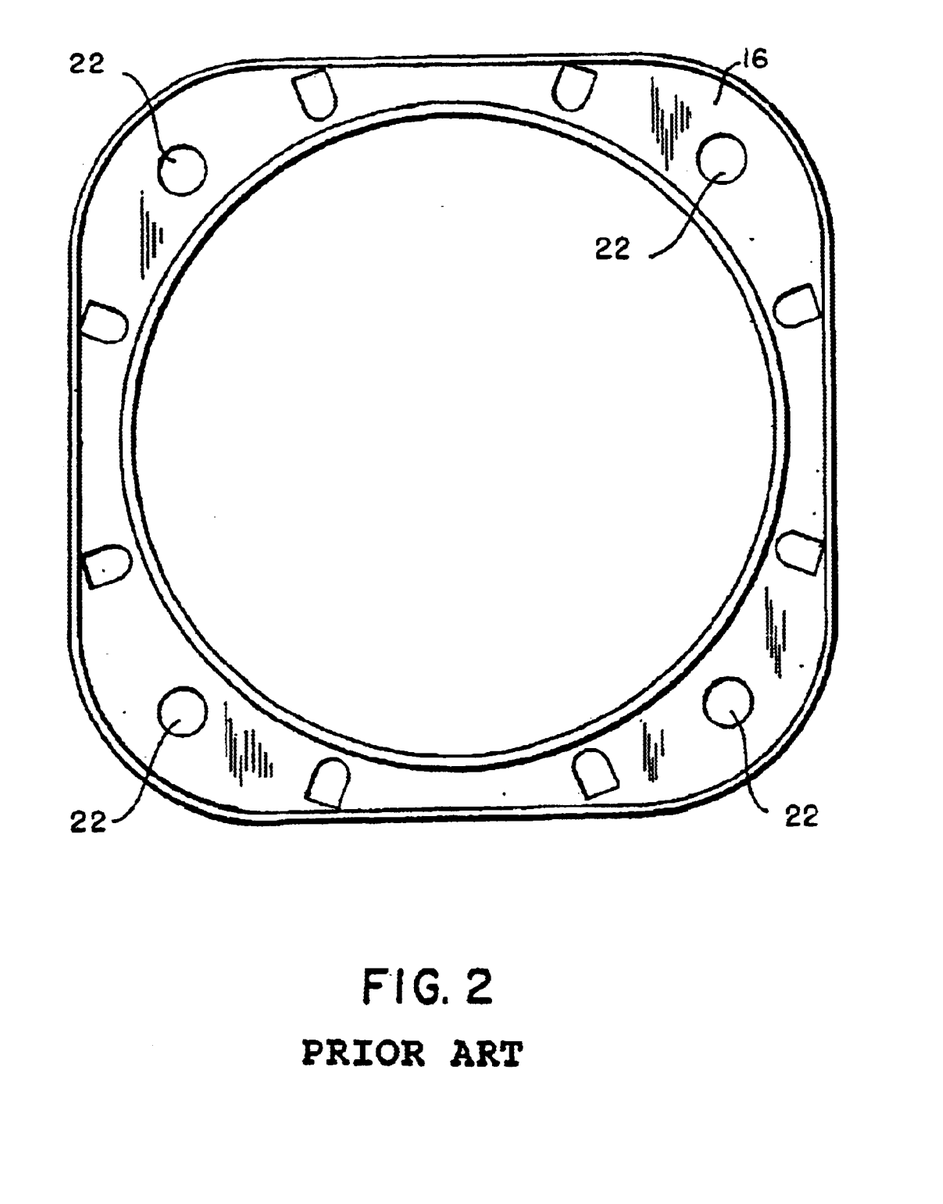
FIG. 2 is a top view of a retaining ring of the prior art airbag module of FIG. 1.
Figure 3:
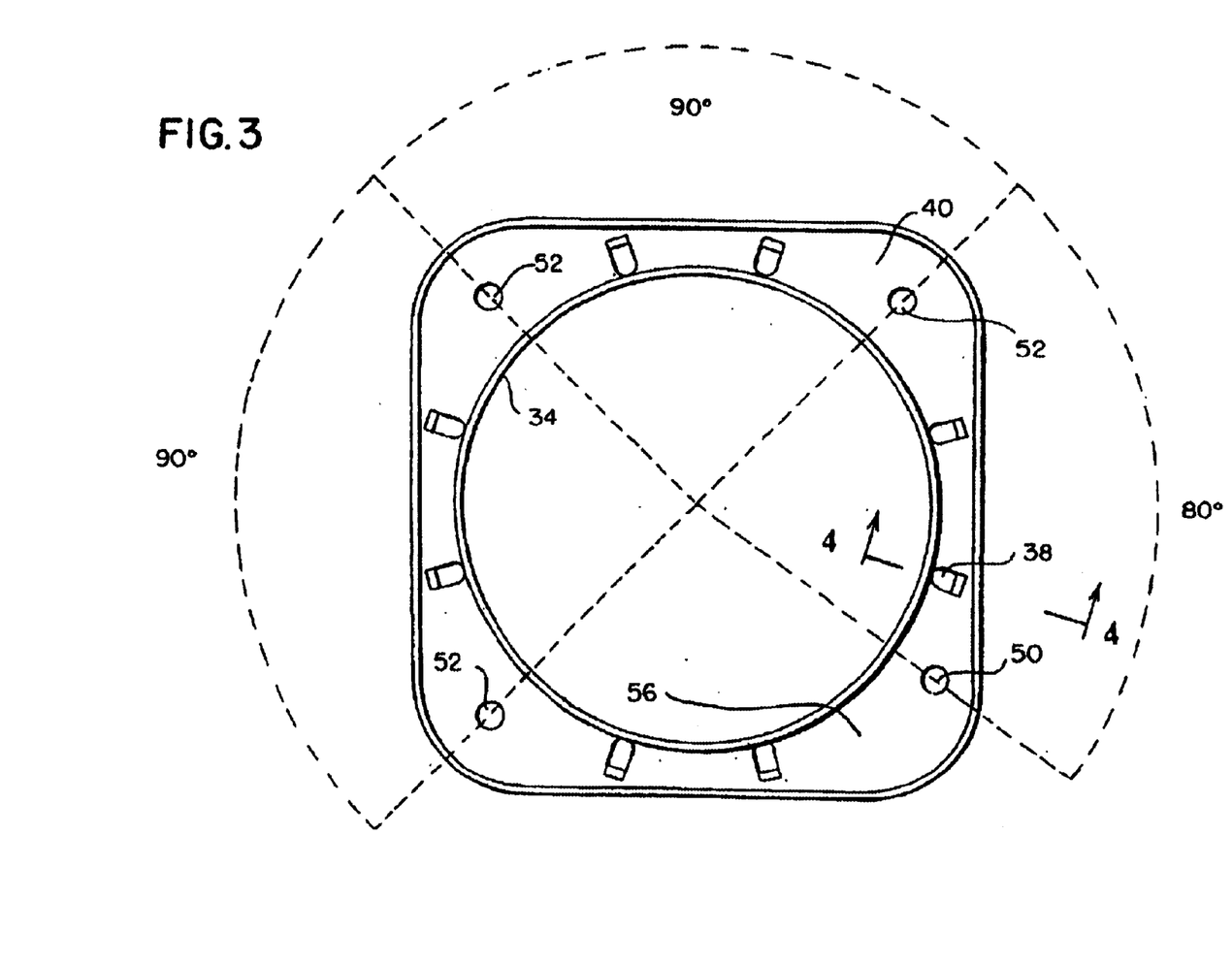
FIG. 3 is a top view of a retaining ring having an offset fastener opening according to the present invention.
Figure 4:
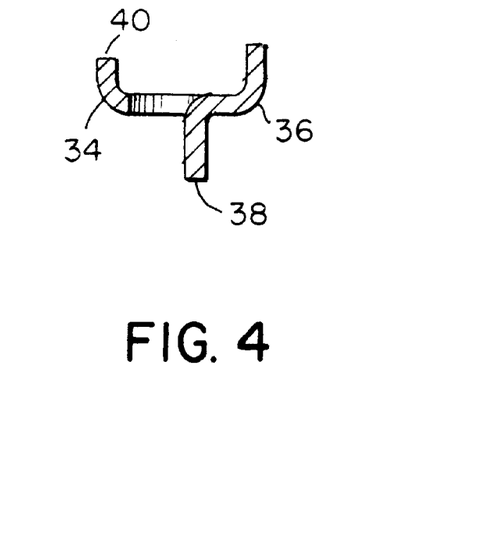
FIG. 4 is an enlarged cross-section of the retaining ring taken along line 4—4 of FIG. 3.

As shown in FIG. 2, the retaining ring fastener openings 22 of the prior art retaining ring 16 are equally spaced at an angle of 90° about the ring. The fastener openings in the airbag, housing module and inflator are also similarly aligned at 90° about the respective components. A retainer cover (not shown) also includes fastener openings separated by an angle of 90°. Thus, since all the fastener openings of the components are symmetrical, misalignments of the parts can occur easily during assembly, The present invention provides an annular retaining ring 40, as shown in FIG. 3, having an inner wall or boundary 34 and an outer wall or boundary 36. A plurality of axially descending tabs 38, best shown in FIG. 4, extend from retainer ring 40. Retaining ring 40 can be made from any structurally suitable material such as plastic or metal, with metals such as aluminum or steel being preferred for strength. Tabs 38 can be welded on retaining ring 40, cast from a single piece of metal, or preferably by stamping and forming the retaining ring 40 out of a single, stronger piece of metal. The stamped retaining ring has the further advantage of using less metal, thus being a low cost efficient means of manufacture.

Figure 6:
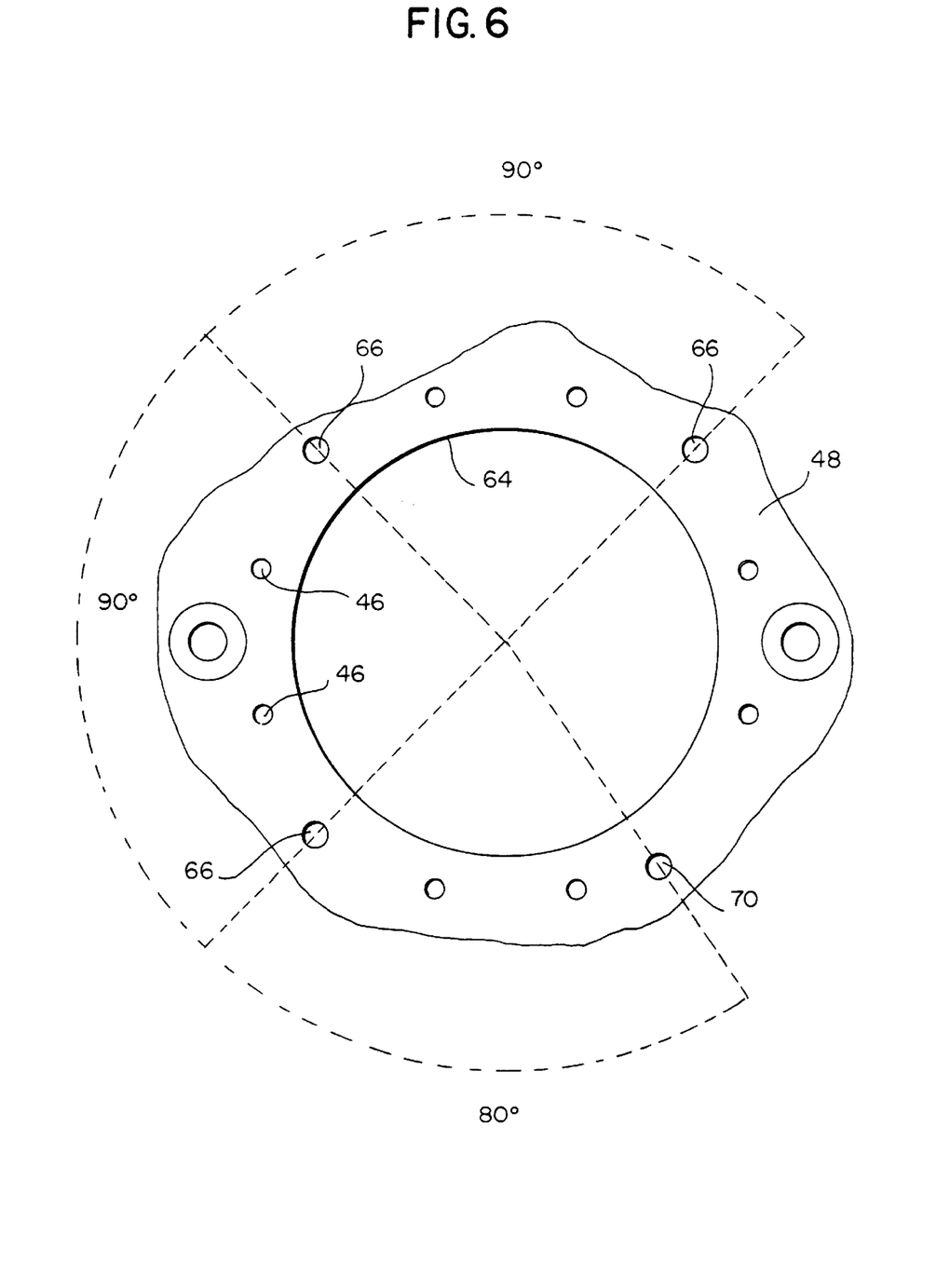
FIG. 6 is a top view of the module housing illustrating the housing fastener holes and openings.
Figure 7:
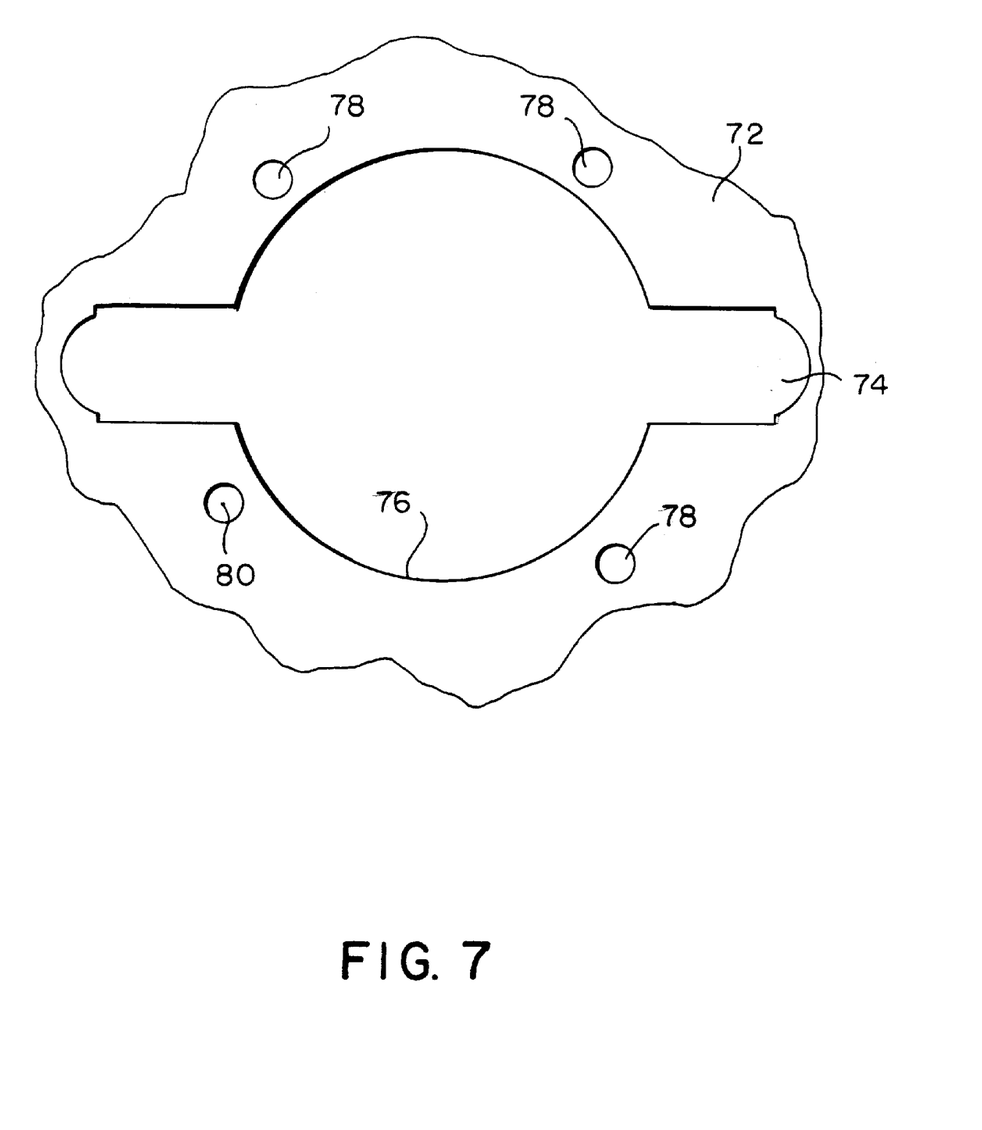
FIG. 7 is a top view of the retainer cover illustrating the cover fastener openings.

Tabs 38 can be inserted through fastener holes 44 of an airbag 42, as shown in FIG. 6, through fastener holes 46 of module housing 48, shown in FIG. 7, and then deformed or bent to engage the bottom of module housing 48. Thus, the airbag 42 is firmly held between the retaining ring 40 and the module housing 48 during the remainder of the module assembly without the need for further closure means.

Figure 9:
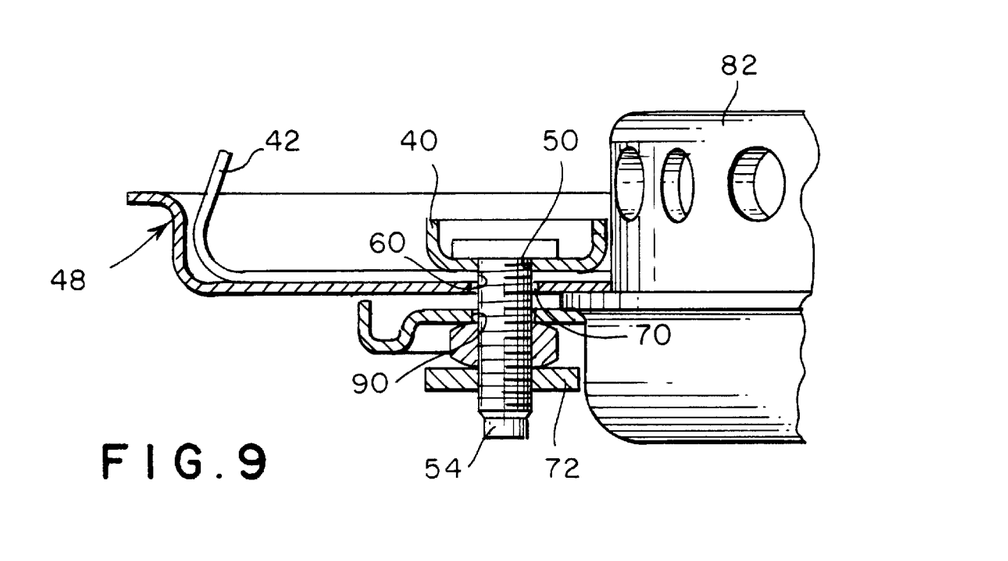
FIG. 9 is a partial cross-sectional view of the assembled retaining ring, airbag, module housing, retainer cover and inflator of the present invention.

Referring once again to FIG. 3, retaining ring 40 also includes a plurality of retainer fastener openings 52 separated by an angle of 90°. An additional retaining ring fastener opening 50 is offset by, for example, an angle of 10° from one of the retaining ring fastener openings 52. Thus, offset fastener opening 50 is separated from the closet retaining ring fastener opening 52 by, for example, an angle of 80°. It should be appreciated that specific degree of offset can be selected from a range of degrees, and is not limited to the described 10° offset. A stud 54, as shown in FIG. 9, is pressed through fastener openings 50, 52 prior to assembly, which will be described further herein.

As shown in FIG. 3, retainer ring 40, as well as the other components, can include a visual indicating means 56 in the vicinity of the offset fastener opening 50, for example, an upraised portion or additional smaller hole, to aid the operators in identifying the offset openings of the components during assembly.

Figure 5:
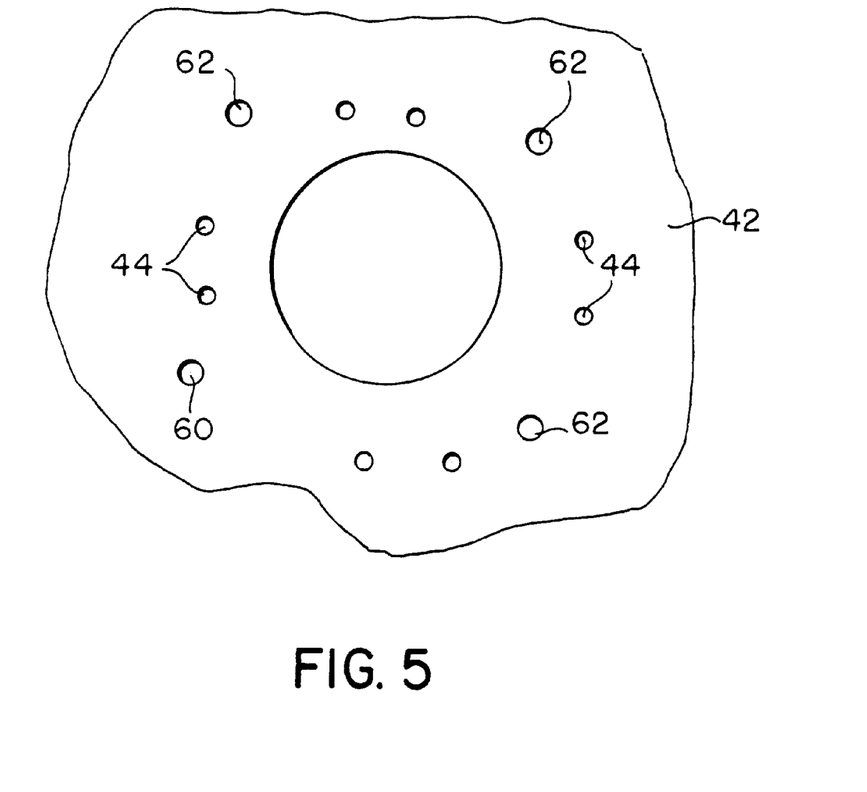
FIG. 5 is a top view of an airbag illustrating the airbag fastener holes, fastener openings and central opening thereof.

As shown in FIG. 5, the air bag 42 includes a central gas inlet opening 58 which conforms to the general shape of the inflator. Radially outward of central opening 48 are a plurality of airbag fastener openings 62 and a single offset airbag fastener opening 60. Like the fastener openings of retainer ring 40, airbag fastener openings 62 are spaced at 90° and offset airbag fastener opening 60 is separated from the nearest opening 62 by an offset of 10° or an angle of 80°.

The module housing 48, as shown in FIG. 6, has an inner opening 64 which conforms to that of the inflator. In addition to fastener holes 46, through which tabs 38 of retaining ring 40 pass, housing 48 includes a plurality of housing module fastener openings 66. An additional offset housing module fastener opening 70 is provided. Offset fastener opening 70 is offset by, for example 10°, so as to be separated from the nearest opening 66 by, for example, an angle of 80°. When the airbag 42 is clamped between retaining ring 40 and housing 48, stud 54 extends through aligned offset openings 60 and 70.

FIG. 7 illustrates a retainer cover 72 having a central opening 76. Retainer cover 72 includes a plurality of cover fastener openings 78 and an offset cover fastener opening 80, which is also offset by, for example, 10°. When cover 72 is positioned on the inflator offset cover fastener opening 80 aligns with offset airbag fastener opening 70 and offset housing fastener opening 60 and stud 54 extends therethrough.

Figure 8:
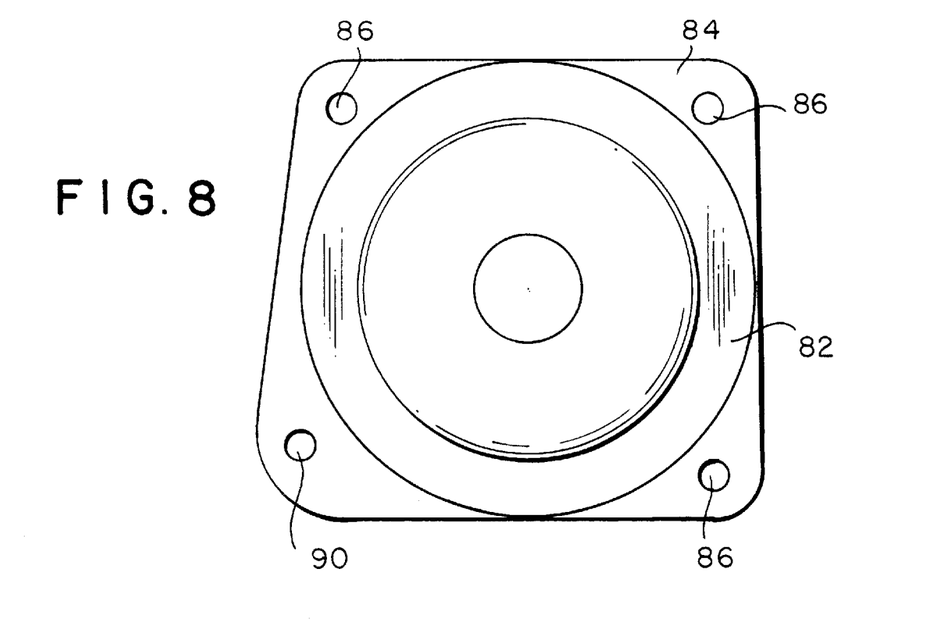
FIG. 8 is a top view of the inflator illustrating the inflator fastener openings.

As shown in FIG. 8, inflator 82 includes a flange 84 and a plurality of connector fastener openings 86 separated by 90°. An offset connector opening 90 is also provided and is offset to be separated from the nearest opening 86 by an angle of 80°. Offset opening 90 of the inflator is designed to be aligned with offset opening 80 of the retainer cover, offset housing fastener opening 70, offset airbag fastener opening 60 and offset retainer ring opening 50.

Next assembly of the airbag module will be described. Fastening studs 54 are inserted through retainer ring fastening openings 50, 52 and press fit into place. Retainer ring 40 is then inserted into airbag 42 through gas inlet opening 58, such that the stud extending through offset ring fastener opening 50 also extends through offset airbag fastener opening 60. The remaining studs 54 are inserted through airbag fastener openings 62. The module housing 48 is then placed over the airbag gas inlet opening 58 and offset housing fastener opening 70 is aligned with the stud extending through offset airbag fastener opening 60.

With the airbag clamped between retainer ring 40 and module housing 48, the airbag 42 can be folded. Next, the inflator 82 is inserted through the module housing inlet 64 and the offset inflator fastener opening 90 is aligned with the offset openings and stud of the retainer ring and housing module. Thereafter, retainer cover 72 is installed over the inflator such that offset cover fastener opening 80 is aligned with offset fastener openings 90 of the inflator.

The offset design of the present invention allows all of the components to be properly aligned and creates a no-build condition unless all of the module components are properly aligned.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An airbag mounting system for orienting a retaining ring, an airbag cushion and a housing module of an airbag module assembly, comprising:

an annular retaining ring including a plurality of first fastener openings circumferentially spaced about the ring;

a module housing including a plurality of second fastener openings circumferentially spaced about a central inlet opening;

an airbag having a gas inlet opening corresponding with the central opening of the module housing, and including a plurality of third fastener openings spaced about the gas inlet opening; and at least one fastener extending through said plurality of first, second, and third fastener openings for securing the retaining ring, airbag, and module housing together, wherein said first, second and third fastener openings are spaced by a plurality of angles selected such that said first, second and third fastener openings are only alignable in a single orientation of the annular retention ring, the module housing, and the airbag with respect to each other.

2. The airbag mounting system of claim 1, herein each fastener comprises a stud extending through a corresponding one of each of said plurality first, second, and third fastener openings.

3. The airbag mounting system of claim 1, wherein the plurality of first fastener openings comprises an offset first fastener opening, wherein the airbag mounting system further comprising indicating means disposed on said retainer ring in the vicinity of the offset first fastener opening for identifying the offset first fastener opening.

4. An airbag mounting system for orienting an inflator, a retaining ring, an airbag cushion and a housing module of an airbag module assembly, comprising:

an annular retaining ring including a plurality of first fastener openings circumferentially spaced about the ring;

a module housing including a plurality of second fastener openings circumferentially spaced about a central inlet opening;

an airbag having a gas inlet opening corresponding with the central opening of the module housing, and including a plurality of third fastener openings spaced about the gas inlet opening;

an inflator having flange and a plurality of fourth fastener openings circumferentially spaced around the flange; and at least one fastener extending through said plurality of first, second, third, and fourth fastener openings for securing the inflator, retaining ring, airbag, and module housing together, wherein said first, second, third and fourth fastener openings are spaced by a plurality of angles selected such that said first, second, third and fourth fastener openings are only alignable in a single orientation of the annular retention ring, the inflator, the module housing, and the airbag with respect to each other.

5. The airbag mounting system of claim 4, wherein each fastener comprises a stud extending through corresponding one of said plurality of first, second, third, and fourth fastener openings.

6. The airbag mounting system of claim 4, wherein the plurality of first fastener openings comprises an offset first fastener opening, wherein the airbag mounting system further comprising indicating means disposed on said retainer ring in the vicinity of the offset first fastener opening for identifying the offset first fastener opening.

7. An airbag mounting system comprising:

an annular retaining ring including a plurality of first fastener openings circumferentially spaced about the ring;

a module housing including a plurality of second fastener openings circumferentially spaced about a central inlet opening; and an airbag having a gas inlet opening corresponding with the central opening of the module housing, and including a plurality of third fastener openings spaced about the gas inlet opening;

wherein said first, second, and third fastener openings are circumferentially spaced in a radially asymmetrical manner such that said first, second, and third fastener openings are only alignable in a single orientation of the annular retention ring, the module housing, and the airbag with respect to each other.

8. The airbag mounting system of claim 7, further comprising at least one fastener extending through said plurality of first, second, and third fastener openings for securing the retaining ring, airbag, and module housing together.

9. The airbag mounting system of claim 7 further comprising an inflator having a flange and a plurality of fourth fastener openings circumferentially spaced in a radially asymmetrical manner such that the first, second, third, and fourth fastener openings are only alignable in a single orientation of the annular retention ring, the inflator, the module housing, and the airbag with respect to each other.

* * * * *